United States Patent [19]
Dashefsky et al.

[11] Patent Number: 6,098,048
[45] Date of Patent: Aug. 1, 2000

[54] AUTOMATED DATA COLLECTION FOR CONSUMER DRIVING-ACTIVITY SURVEY

[75] Inventors: Donald J. Dashefsky, Roslyn Heights; Karen Fore-Poloniewicz, East Setauket; George A. Shababb, Roslyn Heights, all of N.Y.

[73] Assignee: VNU Marketing Information Services, Inc., New York, N.Y.

[21] Appl. No.: 09/133,090

[22] Filed: Aug. 12, 1998

[51] Int. Cl.[7] .................................................... G06F 17/40
[52] U.S. Cl. .............................. 705/10; 705/13; 701/117; 455/456; 340/438; 709/217
[58] Field of Search .................................. 705/10, 14, 13; 701/117; 709/217; 340/933, 438; 455/456; 235/383; 342/357.06, 357.08

[56] References Cited

U.S. PATENT DOCUMENTS

| | | | |
|---|---|---|---|
| 4,603,232 | 7/1986 | Kurland et al. ........................ | 179/2 AS |
| 5,014,206 | 5/1991 | Scribner et al. ........................ | 364/449 |
| 5,068,656 | 11/1991 | Sutherland .............................. | 340/989 |
| 5,072,380 | 12/1991 | Randelman et al. ...................... | 705/13 |
| 5,331,544 | 7/1994 | Lu et al. .................................. | 364/401 |
| 5,398,190 | 3/1995 | Wortham .................................. | 364/460 |
| 5,406,271 | 4/1995 | Sonnendorfer et al. ........... | 340/825.35 |
| 5,432,841 | 7/1995 | Rimer ........................................ | 379/59 |
| 5,490,060 | 2/1996 | Malec et al. .............................. | 364/401 |

(List continued on next page.)

OTHER PUBLICATIONS

Arora, R. K. GPS out from shadow of Defense Department. "The TInet report." Aug. 1996 [report on–line]; available from http://www.spectrum.ieee.org/INST/aug96/tinet.html; Internet; accessed Feb. 1, 2000. pp. 26–28.

Montgomery, Hale. A Bull Market. "IEEE AES Magazine." (Aug. 1992) pp. 26–28.

How the New Telecommunications Will Change the Way We Live. "Prism" (Arthur D. Little, Inc., Second Quarter 1992) pp. 1–16, Apr. 1992.

Brown, David. "ETC Project Report.." EMTM 552, Department of Computer & INformation Science, University of Pennsylvania, 1999) pp. 1–12, Aug. 1996.

*1995 NPTS User's Guide for the Public Use Data Files: Nationwide Personal Transportation Survey*, United States Department of Transportation, Federal Highway Administration, Publication No. FHWA–PL–98–002, chapters 1–3, (Oct. 1997).

*Primary Examiner*—James P. Trammell
*Assistant Examiner*—John Leonard Young
*Attorney, Agent, or Firm*—Kalow & Springut LLP

[57] ABSTRACT

Consumer driving-activity market research information may be obtained by selecting panelists to form a consumer driving-activity panel. At least one trackable motor vehicle and at least one consumer driver who has use of the vehicle are associated with each panelist of the panel. The trackable motor vehicles associated with the panel provide representatives from a varied plurality of vehicle-classification categories and the consumer drivers associated with the panel provide representatives from a varied plurality of demographic categories. For each panelist, panelist attribute data including vehicle-classification data and driver demographic data are stored in a data processing system. During trip portions of a sample group of trip portions, time-annotated vehicle-location data approximately tracking the movement of each trackable motor vehicle are generated automatically by means of automatic vehicle-location tracking gear on the vehicle. The time-annotated vehicle-location data associated with a trip portion are stored and analyzed to generate a set of vehicle-use data for the trip portion which includes data encoding the date, the time of day, the duration, the starting point and destination coordinates, the distance driven, and a representative speed. Trip-portion vehicle-use data for the sample group of trip portions driven by the vehicle are associated in the data processing system with elements of panelist attribute data concerning the panelist with which the motor vehicle is associated. To obtain the desired consumer driving-activity market research information, trip-portion vehicle-use data and associated panelist attribute data are analyzed statistically over a survey group of panelists of the consumer driving-activity panel.

39 Claims, 3 Drawing Sheets

U.S. PATENT DOCUMENTS

| | | | |
|---|---|---|---|
| 5,557,268 | 9/1996 | Hughes et al. | 340/933 |
| 5,557,524 | 9/1996 | Maki | 364/424.04 |
| 5,592,181 | 1/1997 | Cai et al. | 342/457 |
| 5,636,245 | 6/1997 | Ernst et al. | 375/259 |
| 5,638,077 | 6/1997 | Martin | 342/357 |
| 5,644,723 | 7/1997 | Deaton et al. | 705/14 |
| 5,691,980 | 11/1997 | Welles et al. | 370/316 |
| 5,710,884 | 1/1998 | Dedrick | 709/217 |
| 5,812,959 | 9/1998 | Froeburg et al. | 701/117 |
| 5,815,114 | 9/1998 | Speasl et al. | 342/357.06 |
| 5,825,283 | 10/1998 | Camhi | 340/438 |
| 5,890,068 | 3/1999 | Fattouch et al. | 455/456 |
| 5,952,958 | 9/1999 | Speasl et al. | 342/357.08 |
| 5,974,396 | 10/1999 | Anderson et al. | 705/10 |
| 5,984,182 | 11/1999 | Murrah et al. | 235/383 |

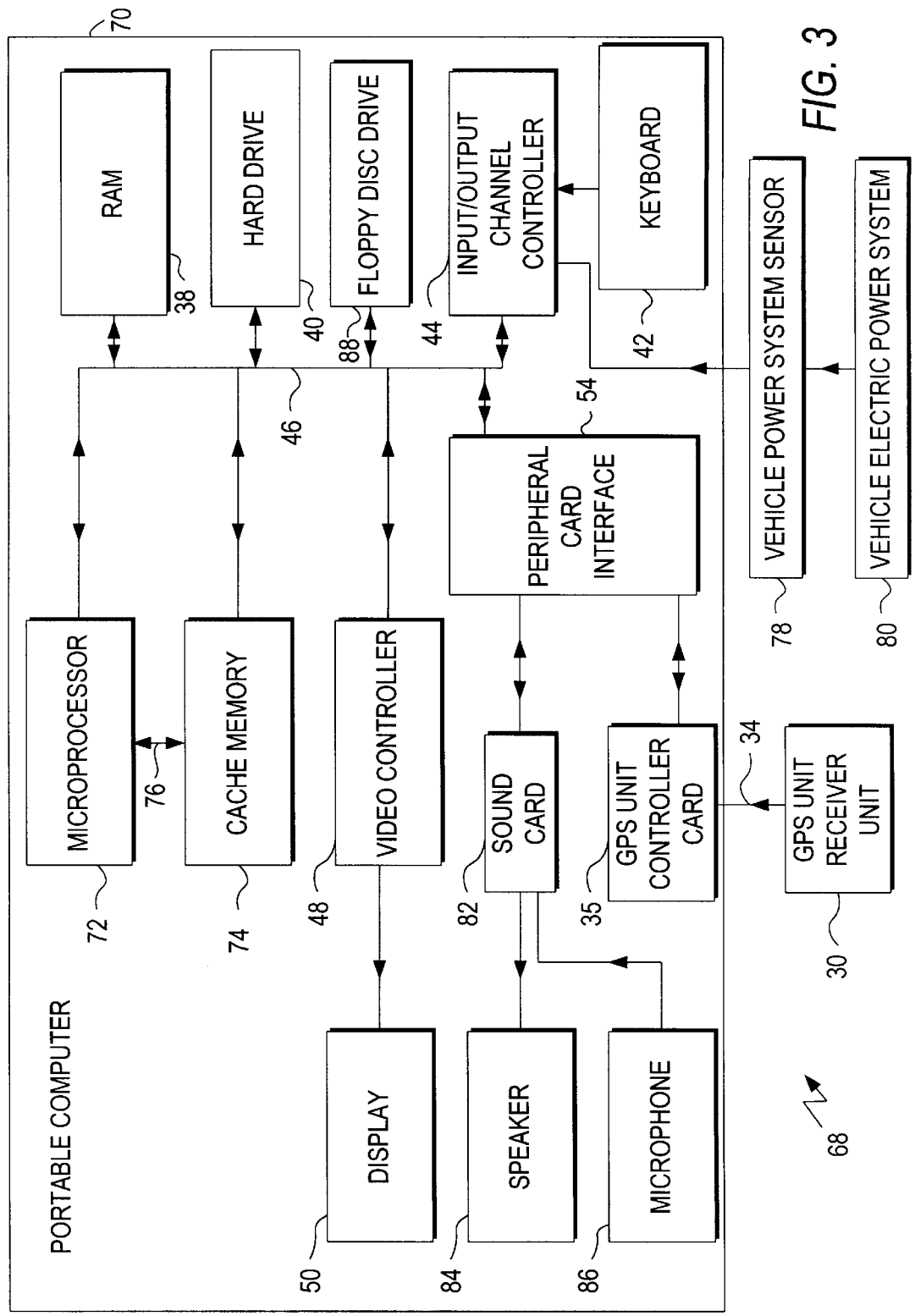

AUTOMATED DATA COLLECTION FOR CONSUMER DRIVING-ACTIVITY SURVEY

1. Field of the Invention

The present invention pertains generally to obtaining market research information, and, more particularly, to collecting data involving the driving activity of consumers for use in obtaining market research information.

2. Background Art

The science of market research makes use of a variety of techniques to obtain statistical information on various markets to support business and governmental decisions. One such market research technique, commonly referred to as a "consumer panel," involves the recruitment of a group of consumers who provide information on the attitudes and purchasing behavior of consumers. Consumer panels are used in a variety of industries such as automotive, packaged goods, media and communications, health care, financial services, and telecommunications, in order to develop more effective sales and marketing strategies Likewise, governmental agencies use consumer panels in connection with planning with respect to public services and policies and infrastructure utilization and design.

Statistical information concerning automobile or other motor vehicle use by a group of consumer drivers over time on a trip-by-trip basis would be of value to many commercial enterprises and governmental authorities. However, as a practical matter, conventional consumer-panel market-research techniques are not suitable for obtaining consumer driving-activity information longitudinally over time. In principle, members of a consumer panel of consumer drivers could be provided with vehicle-use survey diaries in which to record data pertaining to each instance of their use of a vehicle over a prescribed term for a longitudinal survey. However, because of the volume of driving-activity data which would be desired to be recorded in survey diaries for each segment of each trip—identity of driver, starting point, destination, purpose of trip, time of day, date, mileage, routes taken, and speeds driven on the various routes taken—recording all of the desired data accurately would be highly burdensome to the members of the panel, particularly over the extended period of time desirable for a longitudinal statistical survey. Panel members would likely resort to recording driving-activity data in the survey diaries on a "recall" basis after completion of a multi-segment trip, which could tend to bias trip-segment data systematically and thus reduce the value of statistical information derived from the data. Moreover, only the most motivated panel member would be expected to take the trouble to record driving-activity data diligently for each trip segment over the term of the longitudinal survey, even on an after-the-trip recall basis. Unless the panel members were provided with sufficient incentives to motivate them to record the desired data diligently, the accuracy and completeness of the driving-activity data recorded in the survey diaries would be suspect and consequently of little value. On the other hand, if the panel members were provided with incentives sufficiently great to motivate them to record the desired data diligently for each segment of each trip over the survey term, the incentives could tend to influence the driving activities of the panel members, which could tend to bias statistical information derived from driving-activity data in the survey diaries and thereby diminish the value of the information.

A report dated October 1997 entitled "User's Guide for the Public Use Data Files, 1995 Nationwide Personal Transportation Survey," ("the NPTS Report") prepared by the Research Triangle Institute under the sponsorship of the Federal Highway Administration of the United States Department of Transportation, describes a cross-sectional survey of daily personal travel in the United States. The survey included data on daily trips of a random sample of the civilian, non-institutionalized population of the United States. According to the report, the data on daily trips included the purpose of the trip; the means of transport used; how long the trip took; the time of day and day of the week the trip took place; and, if the trip was in a private vehicle, the number of people in the vehicle; the age, sex, worker status, and education level of the driver; the make, model, and model year of the vehicle; and the amount of miles driven in a year by the vehicle. The survey data was collected by selecting telephone numbers at random and, by an initial telephone interview, determining if the telephone number was that of a household. For each household thus selected randomly, data concerning characteristics of household members and household vehicles was collected in the initial telephone interview, travel diaries for each household member five years of age and older were sent by mail to the household, and the household assigned a travel day. The travel diary called for recording data concerning each trip taken by the household member assigned the diary on the travel day, as well as data concerning each trip of 75 miles or more one way taken in a two-week period ending on the travel day. The data recorded in the travel diaries were collected by telephone interviews with the household members within six days of the travel day. Twice for each of the vehicles of the household, a household member provided an odometer reading and the date of the reading by telephone interview, once at about the time the data in the travel diaries was collected and once again two to six months later.

The NPTS Report included a number of tables presenting various statistical analyses of the data collected in the cross-sectional survey. Tables I through III below are taken from the NPTS Report—with footnotes omitted—and provide illustrations of consumer driving-activity information obtained by conventional survey techniques.

TABLE I (Prior Art)
ANNUAL VEHICLE TRIPS, VEHICLE MILES OF TRAVEL,
PERSON TRIPS, PERSON MILES OF TRAVEL, BY TRIP PURPOSE
PER HOUSEHOLD

| PURPOSE | VEHICLE TRIPS | VEHICLE MILES OF TRAVEL | PERSON TRIPS | PERSON MILES OF TRAVEL |
|---|---|---|---|---|
| EARNING A LIVING | | | | |
| To or from Work | 553 | 6,492 | 676 | 7,740 |
| Work Related Business | 80 | 1,393 | 100 | 1,987 |
| Subtotal | 633 | 7,885 | 776 | 9,727 |
| FAMILY AND PERSONAL BUSINESS | | | | |
| Shopping | 501 | 2,807 | 775 | 4,660 |
| Doctor/Dentist | 33 | 309 | 56 | 533 |
| Other Family Business | 626 | 4,307 | 924 | 6,849 |
| Subtotal | 1,160 | 7,423 | 1,755 | 12,042 |
| SCHOOL & CHURCH | | | | |
| Subtotal | 98 | 791 | 337 | 1,973 |
| SOCIAL & RECREATIONAL | | | | |
| Vacation | 2 | 205 | 8 | 578 |
| Visiting Friends/Family | 155 | 1,971 | 314 | 3,867 |
| Other Social/Recreational | 269 | 2,588 | 631 | 6,128 |
| Subtotal | 426 | 4,764 | 953 | 10,573 |

TABLE I-continued (Prior Art)
ANNUAL VEHICLE TRIPS, VEHICLE MILES OF TRAVEL,
PERSON TRIPS, PERSON MILES OF TRAVEL, BY TRIP PURPOSE
PER HOUSEHOLD

| PURPOSE | VEHICLE TRIPS | VEHICLE MILES OF TRAVEL | PERSON TRIPS | PERSON MILES OF TRAVEL |
|---|---|---|---|---|
| MISCELLANEOUS | | | | |
| Other | 2 | 28 | 6 | 131 |
| Purpose Not Reported | 0 | 4 | 1 | 18 |
| Subtotal | 2 | 32 | 7 | 149 |
| TOTAL | 2,321 | 20,895 | 3,828 | 34,463 |

TABLE II (Prior Art)
NUMBER OF VEHICLE TRIPS TAKEN DURING WEEKDAYS
BY TIME OF DAY AND TRIP PURPOSE (THOUSANDS)

| | EARNING A LIVING | FAMILY AND PERSONAL BUSINESS | CHURCH AND SCHOOL | SOCIAL AND RECREATIONAL | OTHER | TOTAL |
|---|---|---|---|---|---|---|
| 12:00 AM–5:59 AM | 3,066,830 | 809,092 | 23,062 | 732,380 | 2,617 | 4,633,982 |
| % of purpose | 5.6% | 1.0% | 0.4% | 3.1% | 1.7% | 2.8% |
| % of start time | 66.2% | 17.5% | 0.5% | 15.8% | 0.1% | 100% |
| 6:00 AM–8:59 AM | 15,982,062 | 9,836,158 | 1,396,231 | 1,628,763 | 17,958 | 28,861,343 |
| | 29.3% | 11.8% | 24.8% | 6.8% | 11.6% | 17.2% |
| | 55.4% | 34.1% | 4.8% | 5.6% | 0.1% | 100% |
| 9:00 AM–12:59 PM | 8,836,495 | 26,062,037 | 1,227,964 | 5,386,372 | 39,463 | 41,558,148 |
| | 16.2% | 31.2% | 21.8% | 22.6% | 25.4% | 24.8% |
| | 21.3% | 62.7% | 3.0% | 13.0% | 0.1% | 100% |
| 1:00 PM–3:59 PM | 8,919,698 | 21,478,013 | 997,439 | 4,226,318 | 30,810 | 35,659,520 |
| | 16.3% | 25.7% | 17.7% | 17.7% | 19.9% | 21.2% |
| | 25.0% | 60.2% | 2.8% | 11.9% | 0.1% | 100% |
| 4:00 PM–6:59 PM | 13,796,940 | 17,891,562 | 1,048,575 | 6,448,765 | 37,673 | 39,232,466 |
| | 25.3% | 21.4% | 18.6% | 27.1% | 24.3% | 23.4% |
| | 35.2% | 45.6% | 2.7% | 16.4% | 0.1% | 100% |
| 7:00 PM–9:59 PM | 2,813,462 | 6,569,254 | 793,076 | 4,283,230 | 24,055 | 14,485,552 |
| | 5.2% | 7.9% | 14.1% | 18.0% | 15.5% | 8.6% |
| | 19.4% | 45.4% | 5.5% | 29.6% | 0.2% | 100% |
| 10:00 PM–11:59 PM | 1,198,767 | 1,013,331 | 153,864 | 1,117,985 | 2,525 | 3,486,474 |
| | 2.2% | 1.2% | 2.7% | 4.7% | 1.6% | 2.1% |
| | 34.4% | 29.1% | 4.4% | 32.1% | 0.1% | 100% |
| TOTAL | 54,620,082 | 83,663,862 | 5,640,585 | 23,827,680 | 155,102 | 167,931,966 |
| % of purpose | 100% | 100% | 100% | 100% | 100% | 100% |
| % of start time | 32.5% | 49.8% | 3.4% | 14.2% | 0.1% | 100% |

TABLE III (Prior Art)
VEHICLE MILES OF TRAVEL AND AVERAGE VEHICLE TRIP LENGTH
BY NUMBER OF HOUSEHOLD VEHICLES AND AGE OF VEHICLE (THOUSANDS)

| VEHICLE AGE | 1 VEHICLE | 2 VEHICLES | 3 OR MORE VEHICLES | TOTAL | AVERAGE TRIP LENGTH (MILES) |
|---|---|---|---|---|---|
| 1 Year or less | 38,259,354 | 104,339,230 | 62,192,796 | 204,791,380 | 10.3 |
| | 9.1% | 10.6% | 9.6% | 9.9% | |
| 2 Years | 37,849,242 | 98,896,152 | 63,042,179 | 199,787,573 | 9.6 |
| | 9.0% | 10.1% | 9.7% | 9.7% | |

TABLE III-continued (Prior Art)
VEHICLE MILES OF TRAVEL AND AVERAGE VEHICLE TRIP LENGTH
BY NUMBER OF HOUSEHOLD VEHICLES AND AGE OF VEHICLE (THOUSANDS)

| VEHICLE AGE | 1 VEHICLE | 2 VEHICLES | 3 OR MORE VEHICLES | TOTAL | AVERAGE TRIP LENGTH (MILES) |
|---|---|---|---|---|---|
| 3 Years | 32,938,784 | 86,933,824 | 51,485,635 | 171,358,243 | 9.0 |
|  | 7.8% | 8.8% | 7.9% | 8.3% |  |
| 4 Years | 35,568,617 | 80,660,012 | 43,950,600 | 160,179,229 | 9.4 |
|  | 8.4% | 8.2% | 6.8% | 7.7% |  |
| 5 Years | 34,235,338 | 69,967,867 | 39,993,138 | 144,196,344 | 8.5 |
|  | 8.1% | 7.1% | 6.2% | 7.0% |  |
| 6 Years | 27,037,529 | 70,294,676 | 39,941,982 | 137,274,187 | 9.0 |
|  | 6.1% | 7.2% | 6.2% | 6.6% |  |
| 7 Years | 30,028,502 | 71,386,681 | 53,318,092 | 154,733,275 | 8.4 |
|  | 7.1% | 7.3% | 8.2% | 7.5% |  |
| 8 Years | 26,808,367 | 60,556,599 | 43,387,116 | 130,752,081 | 8.0 |
|  | 6.4% | 6.2% | 6.7% | 6.3% |  |
| 9 Years | 22,896,981 | 52,212,894 | 38,917,456 | 114,027,331 | 7.9 |
|  | 5.4% | 5.3% | 6.0% | 5.5% |  |
| 10 or more years | 93,622,302 | 185,245,899 | 141,057,389 | 419,925,589 | 7.7 |
|  | 22.2% | 18.8% | 21.8% | 20.3% |  |
| Total | 422,360,441 | 983,465,133 | 648,497,280 | 2,068,433,774 | 9.1 |
|  | 100% | 100% | 100% | 100% |  |
| Average Trip Length (miles) | 8.1 | 9.2 | 9.7 | 9.1 |  |

The NPTS Report acknowledges that there had been requests for certain data related to the survey data, but which were not included in the survey. Among the data requested but not included were data concerning how travel of sampled households changed over time. According to the NPTS Report, the Nationwide Personal Transportation Survey "is a cross-sectional survey, which means that different households were selected for the sample each time it is conducted. The [Nationwide Personal Transportation Survey] is not currently a longitudinal survey, which would involve tracking the same sample households over time." As noted above, conventional market survey techniques are impractical for obtaining longitudinal survey data concerning consumer driving activity.

U.S. Pat. No. 5,406,271 to Sonnendorfer and Wieth ("the Sonnendorfer and Wieth '271 patent") discloses an infrared communication system for shopping carts in a multi-department self-service store. Each shopping cart of the system is equipped with a mobile transceiver/display unit which has an infrared transceiver, a digital memory, and a display. The mobile transceiver/display unit can receive infrared transmissions encoding display information for storage in the memory of the unit and display on the unit's display. Information displayed on the display of a mobile transceiver/display unit mounted on a shopping cart can be viewed by a customer pushing the cart. Each department of the store has a departmental infrared transceiver unit with a digital memory located in the department for storing and transmitting advertising and other display information specific to the department for display on the mobile transceiver/display units on shopping carts in the vicinity of the departmental transceiver unit. The mobile transceiver/display units on the shopping carts are adapted to send a confirmation signal back to the departmental infrared transceiver unit for storage in the memory of the departmental unit to provide a record confirming receipt and display of the display information from the departmental unit. As discussed at column 3, lines 6 through 45 of the Sonnendorfer and Wieth '271 patent, each mobile transceiver/display unit is provided with an identifier code number which can be either automatically broadcast or sampled upon activation by the departmental infrared transceiver units. By recording the code numbers of system carts passing in the vicinity of the various departmental transceiver units and the times the code numbers were received, the system of the Sonnendorfer and Wieth '271 patent can determine the route taken by each customer who pushes a shopping cart through the store and how long each cart remained in the various departments of the store.

An automatic vehicle location system for fleet management involving the use of a satellite global positioning system (GPS) is disclosed in U.S. Pat. No. 5,638,077 to Martin ("the Martin '077 patent"). The vehicle location system of the patent includes a base station and a fleet of vehicles which can range throughout a fleet management area. According to column 5, lines 50 through 59 of the patent, each fleet vehicle is equipped with a GPS receiver, a data modem, an antenna, and a communication network device which can report tracking messages back to the base station via the modem. A tracking message from a fleet vehicle includes identification of a set of satellite signals received on the GPS receiver in the vehicle. According to the Martin '077 patent, the base station can process the information received from the fleet vehicle in accordance with an algorithm specified in the patent to determine the position of the vehicle to an accuracy of ten meters or better without imposing an excessive communications burden on the system.

SUMMARY OF THE INVENTION

We have invented a method and system which may be used to obtain consumer driving-activity market research information accurately and efficiently employing automatic vehicle-location tracking gear and which avoids problems of the prior art noted above.

The method of the invention for obtaining consumer driving-activity market research information includes the steps of selecting a plurality of panelists to form a consumer driving-activity panel. The panelists making up the consumer driving-activity panel may be, for example, consumer drivers, trackable motor vehicles, or households with consumer drivers. At least one subject trackable motor vehicle and at least one subject consumer driver is in association with each panelist of the consumer driving-activity panel. The subject consumer driver in association with the panelist has use of the subject trackable motor vehicle in association with the panelist. For statistical utility, the subject trackable motor vehicles in association with the panelists collectively forming the consumer driving-activity panel provide representatives from a varied plurality of vehicle-classification categories such as automobiles, vans, and sport-utility vehicles. The subject consumer drivers in association with such panelists provide representatives from a varied plurality of demographic categories such as sex, age groups, and income levels.

The method of the invention includes the additional step of, for each panelist in the consumer driving-activity panel, storing panelist attribute data corresponding to the panelist in a data processing system. The panelist attribute data includes vehicle-classification data such as manufacturer and vehicle type concerning each subject trackable motor vehicle in association with the panelist, and demographic data such as sex, age and a representative income level concerning each subject consumer driver in association with the panelist.

The method of the invention includes the further steps of, for each subject trackable motor vehicle and each trip portion of a sample group of trip portions driven by the subject trackable motor vehicle, automatically generating time-annotated vehicle-location data approximately tracking the movement of the subject trackable motor vehicle during the trip portion by means of automatic vehicle-location tracking gear on the subject vehicle and storing the time-annotated vehicle-location data in digital data storage. The time-annotated vehicle-location data for the trip portion comprises a data sequence encoding successive location coordinates and associated times approximately tracking the movement of the subject vehicle during the trip portion.

The method of the invention includes the further step of, for each subject trackable motor vehicle and each trip portion of the sample group of trip portions driven by the subject vehicle, analyzing time-annotated vehicle-location data associated with the trip portion to generate a set of trip-portion vehicle-use data including data encoding the date, the approximate time of day, and the approximate duration of the trip portion; the approximate starting point coordinates and the approximate destination coordinates of the trip portion; the approximate distance driven by the subject vehicle in the trip portion; and a representative approximate speed driven by the subject vehicle during the trip portion.

The method of the invention additionally includes the step of, for each subject trackable motor vehicle, associating trip-portion vehicle-use data for the sample group of trip portions driven by the subject vehicle in the data processing system with elements of panelist attribute data corresponding to the panelist of the consumer driving-activity panel with which the subject trackable motor vehicle is in association.

Finally, the method of the invention comprises the step of analyzing statistically with the data processing system over a survey group of panelists of the consumer driving-activity panel, trip-portion vehicle-use data and associated panelist attribute data to obtain consumer driving-activity market research information.

Advantageously, the method of the invention may be used to obtain consumer driving-activity market research information longitudinally over time.

Preferred consumer driving-activity panels for the method of the invention may be made up of households, trackable motor vehicles, or consumer drivers.

For example, in one preferred method of obtaining consumer driving-activity market research information of the invention, each panelist of the consumer driving-activity panel is a household. The subject trackable motor vehicle in association with the panelist in such preferred method is a motor vehicle of which driver members of the household have use and the subject consumer driver in association with the panelist is a member of the household.

In a second preferred method of the invention, each panelist is a trackable motor vehicle. The subject trackable motor vehicle in association with the panelist in such preferred method is the trackable-motor-vehicle panelist itself. The subject consumer driver in association with the panelist in such method is a consumer driver having use of the trackable-motor-vehicle panelist.

In a third preferred method of the invention, each panelist of the consumer driving-activity panel is a consumer driver. The subject trackable motor vehicle in association with the panelist in such method is a trackable motor vehicle of which the consumer-driver panelist has use. The subject consumer driver in association with the panelist in such method is the consumer-driver panelist himself or herself.

Preferably, the demographic data concerning each subject consumer driver in association with a panelist of the consumer driving-activity panel includes data encoding the age and the sex of the subject consumer driver, a personal income level of the subject consumer driver or a household income level of a household of which the subject consumer driver is a member, and an education level and an employment status of the subject consumer driver.

Preferably, the vehicle classification data concerning each subject trackable motor vehicle in association with a panelist of the consumer driving-activity panel of the method of the invention includes data encoding a manufacturer and a type of the vehicle. Additionally, the vehicle classification data preferably includes the model of the vehicle, the year the vehicle was manufactured, whether the vehicle was purchased or leased, the year the vehicle was purchased or leased, insurance carrier for the vehicle, and an odometer mileage reading for the vehicle together with the date of the odometer mileage reading.

In one particularly preferred embodiment of the method of obtaining consumer driving-activity market research information of the invention, the automatic vehicle-location tracking gear on each subject trackable motor vehicle includes a global positioning system ("GPS") satellite receiver for receiving GPS satellite signals for determining location geodetic coordinate data specifying the approximate location of the subject vehicle at the time the satellite signals were received.

In one preferred embodiment of the method of obtaining consumer driving-activity market research information of the invention, the data processing system is located in a central station and is in communication with wireless receiver gear. In such preferred embodiment, each subject trackable motor vehicle is equipped with wireless transmitter gear connected to the automatic vehicle-location tracking gear. The steps of automatically generating and storing time-annotated vehicle-location data for each subject trackable motor vehicle and each trip portion of the sample group of trip portions in such preferred embodiment includes continually transmitting signals encoding vehicle-location data generated by means of the automatic vehicle-location tracking gear from the wireless transmitter gear on the subject vehicle to the wireless receiver gear and storing time-annotated vehicle-location data for the trip portion in digital data storage of the data processing system at the central station. Preferably, the wireless transmitter gear and the wireless receiver gear constitute elements of a cellular telephone system.

In a more preferred embodiment of the invention, each subject trackable motor vehicle includes read/write data storage facilities on board the vehicle connected to the automatic vehicle-location tracking gear. The steps of automatically generating and storing time-annotated vehicle-location data for each subject trackable motor vehicle and each trip portion of the sample group of trip portions in such preferred embodiment includes storing the time-annotated vehicle-location data in the read/write data storage facilities on board the subject vehicle. If, as is preferred, the data processing system of such preferred embodiment of the method of the invention is located at a central station, the method preferably further includes a step of, for each subject trackable motor vehicle and each trip portion of a data-report group of trip portions driven by the subject vehicle, transferring time-annotated vehicle-location data corresponding to the data-report group of trip portions from the read/write data storage facilities on board the subject vehicle to the data processing system at the central station.

In one such preferred embodiment involving read/write data storage facilities on the subject vehicles, the data storage facilities on board each subject trackable motor vehicle is preferably adapted to store time-annotated vehicle-location data in removable mass-storage media such as a digital magnetic tape, a floppy magnetic disc, or a removable hard magnetic disc and the data processing system in the central station includes a removable-media reader for reading the removable mass-storage media. Preferably, the step of transferring the time-annotated vehicle-location data corresponding to the data-report group of trip portions from the read/write data storage facilities on the subject vehicle to the data processing system in the central station in such embodiment includes the steps of storing such vehicle-location data on removable mass-storage media in the read/write data storage facilities, removing the removable mass-storage media on which the time-annotated vehicle-location data was recorded from the data-storage facilities on the subject vehicle, transporting the removable mass-storage media to the data processing system at the central station, and reading the removable mass-storage media at the central station with the removable-media reader of the data processing system.

In an alternative one such preferred embodiment involving read/write data storage facilities on board each subject vehicle, the time-annotated vehicle-location data may be transferred from the data-storage facilities on the subject vehicle to the data processing system in the central station by way of a modem and telephone line connection.

The representative approximate speed of preferred methods of the invention, for example, may be an approximate average speed or may be an approximate maximum speed.

Preferably, the step of analyzing time-annotated vehicle-location data associated with each trip portion of the sample group of trip portions comprises using location coordinates encoded in the data sequence of the time-annotated vehicle-location data for the trip portion to access route-designator data in a location-coordinate-indexed route-designator table in digital data storage. The route-designator data so accessed encodes a designation of a route taken by the subject vehicle in the trip portion. More preferably, the route-designator data in the route-designator table includes data encoding a speed limit associated with the route designated by the route-designator data. The representative approximate speed of the trip-portion vehicle-use data is preferably an approximate maximum speed driven by the subject trackable motor vehicle on the route designated by the route-designator data and the step of analyzing time-annotated vehicle-location data associated with each trip portion of the sample group of trip portions comprises comparing the approximate maximum speed driven by the subject vehicle on the route designated by the route-designator data with the speed limit associated with the route.

In a particularly preferred embodiment of the method of obtaining consumer driving-activity market research information of the invention, the step of analyzing time-annotated vehicle-location data associated with each trip portion of the sample group of trip portions further comprises using destination coordinates of the trip-portion vehicle-use data for the trip portion to access location-designator data in a location-coordinate-indexed location-designator table in digital data storage. The location-designator data so accessed encodes a name and type or other designation of a destination of the trip portion.

Preferably, each subject trackable motor vehicle is equipped with a portable digital computer having a microprocessor, read/write data storage, and input/output facilities. The portable computer is connected to the automatic vehicle-location tracking gear on board the subject vehicle. Each trip portion of the sample group of trip portions essentially constitutes a trip segment extending from a first vehicle-stationary condition at a trip-segment starting-point location to a second vehicle-stationary condition at a trip-segment destination location. Preferably, the method of the invention further includes the steps of, for each subject trackable motor vehicle and each trip segment of the sample group of trip segments, outputting a trip-segment polling prompt message when the vehicle is located at the trip-segment starting-point location using the input/output facilities of the portable computer and storing in the portable computer a reply to the polling prompt message entered into the computer using the input/output facilities of the computer. Preferably, the trip-segment polling prompt message for each trip segment of the sample group of trip segments includes prompts for identification of the driver of the subject vehicle, any passengers in the subject vehicle, and the purpose of the trip segment. The prompt for identification of the driver of the subject vehicle preferably includes a driver-choice menu output using the input/output facilities of the computer listing each driver who is a member of a household with which the subject vehicle is in association. Likewise, the prompt for identification of any passengers in the subject vehicle preferably includes a passenger-choice menu listing each member of the household, and the prompt for identification of the purpose of the trip segment preferably includes a purpose-choice menu listing choices for trip-segment purposes. The step of storing a reply to the polling prompt message preferably includes storing a choice of driver selected from the driver-choice menu, any choices of passenger selected from the passenger-choice menu, and a choice of trip-segment purpose selected from the purpose-choice menu entered using the input/output facilities of the computer.

Preferably, the input/output facilities of the portable computer on each subject trackable motor vehicle include a visual display output and a manual keyboard input or a touchscreen input. More preferably, the input/output facilities of the portable computer include an audio speaker output drivable by voice synthesis software running on the computer and a microphone digitizer input adapted to provide digitized speech data to speech recognition software running on the computer.

In one preferred embodiment of the invention, for each subject trackable motor vehicle, a starting point location for each grip segment is identified by manual entry of a mark-trip-segment-start message into a portable computer on board the vehicle by the driver of the vehicle using input/output facilities of the computer at a time when the vehicle is stopped just prior to the start of the trip segment. Responsive to entry of the mark-trip-start-message in the portable computer, starting-point location coordinates are determined and a trip-segment polling prompt message is output using the input/output facilities of the portable computer.

In a more preferred embodiment of the invention, the starting-point locations for trip segments are identified automatically by monitoring a vehicle electric power system of each subject trackable motor vehicle. In general, each subject trackable motor vehicle has a vehicle electric power system. The vehicle electric power system is in a vehicle-electrical-power-on condition when the subject vehicle is being driven and the subject vehicle generally is stationary when the vehicle electric power system is in a vehicle-electrical-power-off condition. In such preferred embodiment, a portable computer on board the subject vehicle is in vehicle-electrical-power-on/off-monitoring communication with the vehicle electric power system of the vehicle. Such preferred method further comprises the steps of monitoring the electric power system of each subject trackable motor vehicle with the portable computer on the subject vehicle to detect a transition from a vehicle-electrical-power-off condition to a vehicle-electrical-power-on condition and, responsive to detecting such power-off-to-power-on transition—which ordinarily marks the start of a trip segment—outputting the trip-segment polling prompt message.

In a preferred embodiment of the invention, the respective destinations of the trip segments are identified automatically by monitoring the vehicle electric power system of each subject trackable motor vehicle. In such preferred embodiment, each subject trackable motor vehicle is preferably equipped with a portable digital computer having a microprocessor, read/write data storage, and input/output facilities. The portable computer is connected to the automatic vehicle-location tracking gear of the subject vehicle and in vehicle-electric-power-on/off-monitoring communication with a vehicle electric power system of the vehicle. For each subject trackable motor vehicle and each trip segment of the sample group for trip segments, such preferred method includes the steps of monitoring the electric power system of each subject trackable motor vehicle to detect a transition from a vehicle-electrical-power-on condition to a vehicle-electrical-power-off condition and, responsive to detecting such power-on-to-power-off transition which generally marks arrival of a vehicle at a destination, storing trip-segment destination location data encoding location coordinates of the subject vehicle to define destination coordinates for the trip segment.

In an alternative embodiment of the invention, the destinations of trip segments are identified by manual entry of mark-trip-segment end messages into a portable computer on board each subject vehicle by the driver of the vehicle at times when the vehicle is stopped after arriving at a destination.

Preferably, the step of analyzing time-annotated vehicle-location data associated with each trip segment of the sample group of trip segments further comprises using destination coordinates of the trip-segment vehicle-use data for the trip segment to seek location-designator data in a location-coordinate-indexed location-designator table in digital data storage of a portable computer on board a subject vehicle. If found, the location-designator data encodes a name and type or other designation of a location for the destination of the trip segment. In the event no location-designator data corresponding to the destination coordinates is found in the location-designator table, a destination-designation prompt message is preferably output using the input/output facilities of the portable computer prompting for identification of a name and type or other designation of the destination. Any reply to the destination-designation prompt message is stored in the location-designator table as location-designator data indexed with the destination coordinates.

In a particularly preferred method of obtaining consumer driving-activity market research information of the invention, the method comprises the step of, for each subject trackable motor vehicle and each trip segment of the sample group of trip segments at the trip-segment destination location, using destination coordinates of the trip-segment vehicle-use data for the trip segment to access location-designator data in a location-coordinate-indexed location-designator table in a portable computer on board the subject vehicle. The location-designator data so accessed encodes a name and type designation for the destination of the trip segment. The input/output facilities of the portable computer are used to output a destination-activity prompt message corresponding to the destination designated by the location-designator data prompting for information concerning activities carried out at the destination. Any reply to the destination-activity prompt message entered into the portable computer using the input/output facilities of the computer is stored in the computer.

Preferably, if the destination designated is a retail store, the destination-activity prompt message corresponding to the destination preferably comprises a prompt for any amount of money spent at the store. If the destination designated is a shopping center, the destination-activity prompt message corresponding to the destination designated preferably includes prompts for identification of any businesses visited at the shopping center and identification of businesses at the shopping center at which purchases were made. If the destination designated is a service station, the destination-activity prompt message corresponding to the destination preferably comprises prompts for identification of the quantity of any gasoline purchased at the service station and identification of the price paid for the gasoline.

It is preferred for the embodiment of the method of the invention which involves outputting destination-activity prompt messages on a portable computer on board each subject trackable motor vehicle for the method to include a step of, for each subject trackable motor vehicle, reprogramming the portable digital computer on the subject vehicle from time to time to change destination-activity prompt messages output using the input/output facilities of the computer. For example, a destination-activity prompt message could be changed by reprogramming the portable computer of each subject vehicle to prompt for identification of whether the subject consumer driver had encountered a particular advertising campaign pertaining to the destination designated corresponding to the prompt message.

Certain practices are preferred to tend to insure that a consumer driving-activity panel provides reliable information concerning attitudes and driving behavior among the general driving population. Such preferred practices involve the following matters, which are discussed below: representative sampling and recruitment procedures; effectively continuous vehicle-location data collection; post-data-collection processing; and non-biasing relationship management.

1. Representative Sampling and Recruitment Procedures

Candidates invited to join a consumer driving-activity panel should preferably represent the characteristics of the general population along two dimensions: individual demographic attributes of drivers associated with panelists and vehicle classification attributes of vehicles associated with the panelists. With respect to individual demographic attributes, the age and sex ratios of drivers associated with the panel should preferably conform to the general age and sex ratios of all drivers. For example, a preferred consumer driving-activity panel would include a proportional number of older female drivers to the number of older female drivers in the driving population generally and a proportional number of teenage male drivers to the number of teenage male drivers in the general driving population. With regard to vehicle classification attributes, the vehicles driven by drivers associated with the panel preferably should conform to the vehicle profile of the general driving population with respect to manufacturer, age and type. To obtain a representative consumer driving-activity panel, statistical quota sampling techniques are preferably employed to ensure representation by the panel of drivers and vehicles respectively on their individual demographic attributes and vehicular attributes.

As noted above, consumer driving-activity panels of preferred embodiments of the invention may be constituted of households, consumer drivers, or trackable motor vehicles. Preferably, panelists of a consumer driving-activity panel are selected on a household-by-household basis by market-survey criteria applied to the households. Each household to which the market survey criteria are applied should have at least one member who is a licensed driver and who has the use of an automobile or other motor vehicle associated with the household. Preferably, for each household of the survey group, household demographic data is obtained, including the number of members of the household, household income level, and the age and sex of each automobile driver in the household.

The number of panelists in the consumer driving-activity panel preferably exceeds 2,000 for purposes of statistical utility and more preferably exceeds 10,000.

2. Effectively Continuous Vehicle-Location Data Collection

Each subject vehicle in association with a panelist of the consumer driving-activity panel is fitted with automatic vehicle-location tracking gear. The vehicle-location tracking gear permits the geographical location of the subject motor vehicle to be tracked automatically effectively continuously at least during such times as the vehicle is being driven. In particular, the automatic vehicle-location tracking gear permits time-annotated vehicle-location data to be collected automatically for each trip segment a subject vehicle is driven. Such vehicle-location data includes a data sequence preferably encoding successive location longitude-and-latitude geodetic coordinates of the vehicle and corresponding successive times as the vehicle is driven over the trip segment.

In one preferred embodiment of the invention, a central tracking station includes vehicle-location-tracking communication equipment for remotely tracking the respective locations of all the subject vehicles associated with the consumer driving-activity panel effectively simultaneously by means of communicating with remote location identifier gear on the vehicles. For example, the central tracking station may employ cell-site trilateration techniques to remotely track the locations of the subject vehicles. Preferably, the central tracking station includes wireless telephonic or other communication equipment which enables the particular driver of a subject motor vehicle to be identified for each trip.

In a more preferred embodiment, each subject motor vehicle is fitted with a GPS receiver unit for receiving location-defining signals from GPS satellites and deriving from the location-defining signals geodetic coordinates for the location at which the signals were received. Suitable GPS receiver units are commercially available which can be mounted in an automobile or similar motor vehicle and connected to a portable computer by means of a GPS unit controller card which plugs into a standard "PC Card" connection slot of the computer. One such GPS receiver unit is commercially available under the trade name "Etak Sky Map" from ETAK, Inc. of Menlo Park, Calif. Another such GPS receiver unit is commercially available under the trade name "Door to Door Co Pilot" from TravRoute Software of Princeton, N.J. Preferred portable computers to which each GPS receiver units can be connected provide a microprocessor, random access memory, read/write mass storage, and input/output facilities including a visual display, keyboard, speaker, and microphone digitizer and can run voice recognition and speech synthesis software.

A particularly preferred GPS receiver unit for the invention is a standalone "personal navigation assistant" commercially available under the trade name "RouteFinder PNA" from DATUS Inc. of San Jose, Calif. The "RouteFinder PNA" includes a microprocessor, random-access read/write memory, read-only memory, a backlit LCD display, a telephone-style keypad, a speaker, and two "PC Card" peripheral-device-card slots. A first one of the peripheral-device-card slots may be used for a memory peripheral device card for storing map data used by the unit. A second of the peripheral-device-card slots could be used in a preferred embodiment of the invention for a modem for transferring vehicle-use data to a data processing system at a central station. The "RouteFinder PNA" standalone GPS receiver unit may be removably mounted on a dashboard of a motor vehicle by means of a hook-and-loop type fastener and powered by connection to a cigarette lighter in the vehicle. The preferred standalone GPS receiver unit can thus be readily removed from the vehicle to prevent theft when the vehicle is parked and for connection of the modem peripheral device card to a telephone line for transfer of vehicle-location data stored in the unit to the data processing system of the central station.

3. Post Data-Collection Processing

Standing alone, disaggregate time-annotated vehicle-location data such as time-annotated GPS geodetic coordinate data collected from the subject vehicles are essentially meaningless. Data reduction and statistical analysis techniques may be used to merge disaggregate, vehicle-location data with individual demographic data or vehicle classification data or both to convert the disaggregate vehicle-location data into meaningful market research information. The method of the invention preferably includes analyzing statistically vehicle-use data over the various trip portions of a sample group of trip portions taken by each subject motor vehicle and associating the resulting analyzed vehicle-use data with panelist attribute data including vehicle-classification data and demographic data concerning the driver of the vehicle and the household with which the vehicle is associated. In particular, such panelist attribute data preferably would include the age and sex of the driver; the make, model and age of the vehicle, and the number of members and income level of the household.

Examples of preferred data reduction and statistical analysis techniques for the method of obtaining consumer driving-activity market research information of the invention include:

conversion of the sequence of latitude and longitude coordinate measurements for each trip segment to calculate distance traveled in the trip segment and then correlation of the resulting trip-segment distance-traveled data with the age and sex of the driver or with the make, model, and age of the vehicle;

conversion of the sequence of latitude and longitude coordinate measurements together with associated time stamps for each trip segment to calculate a trip segment speed and then correlation of the resulting trip-segment speed data with the age and sex of driver or with the make, model, and age of the vehicle or with data encoding weather conditions at the day, time, and geographic region of the trip segment; and merging latitude and longitude coordinate data with location designation information to determine the nature of destinations visited (for example, shopping, work, or recreation) and the frequency of their visitation.

If desired, statistical weighting procedures may be employed in connection with the data reduction and statistical analysis. Despite efforts to insure appropriate individual demographic and vehicular characteristics, incoming data are often subject to certain biases due to the nature of consumer response rates. It is generally observed by market research practitioners that response rates vary by socioeconomic strata. To correct for potential response bias, driving activity data may be statistically weighted to conform to individual consumer's age and sex and vehicle make and type norms. In the absence of such statistical weighting, inferences might be subject to under representation or over representation of various population segments.

4. Non-biasing Relationship Management

Through their on-going participation, panelists of a consumer driving-activity panel provide continuous information, which permits longitudinal, time-series measurements which are of particular value, especially in view of the difficulty of obtaining such longitudinal measurements by conventional techniques. To engage and retain the participation of panel members over time, certain relationship management techniques may be desirable, as discussed below.

As a part of the recruitment process, prospective panelists are preferably provided with certain assurances regarding the permissible uses of the data collected from participants with respect to the panel. Of particular importance is the assurance of an individual's anonymity. All participants should be assured that data for an individual driver and vehicle will not be divulged to any third party without permission from the participant concerned except pursuant to court order. Data from each participating individual and vehicle will be combined with other data from other individuals and vehicles, and reported to third parties only at an aggregated summary level, which assures anonymity of the participants.

Beyond limiting permissible uses of data collected from participants with respect to a consumer driving activity, relationship management may also involve the use of incentive techniques to motivate and engage the participation of individuals in the program over time. Importantly, the use of incentive techniques should not influence the behavior sought to be measured—an effect which is sometimes referred to as the "Hawthorne Effect." Examples of preferred incentive techniques include:

Participation in a point accumulation program analogous to the frequent-flyer programs of the airline industry, which result in certain redemption privileges;

Eligibility for sweepstakes drawings;

Eligibility for roadside assistance programs; and

Receipt of nominal gifts and panelist communication materials.

The resulting consumer driving-activity market research information could be used by insurance companies, vehicle manufacturers, vehicle accessory manufacturers, and other marketers in connection with designing new products and devising and evaluating marketing campaigns. The method and system of the invention may be used to obtain consumer driving-activity information efficiently and accurately for cross-sectional surveys of the type exemplified by the information set forth in prior-art Tables I through III above. Moreover, with preferred embodiments of the invention, longitudinal consumer driving-activity market research information can be obtained. Such longitudinal consumer driving-activity market research information could be used, for example, by marketers to provide a measure of the effect of an advertising campaign on driving activity. For example, changes in the frequency of visits by drivers to a particular retail store or to a chain of retail outlets—and their competitors—following introduction of an advertising campaign for the store or retail outlet chain could be measured. Governmental authorities could use consumer driving-activity market research information to advantage, for example, in planning public transportation routes and highway, bridge, and other infrastructure improvements. Longitudinal consumer driving-activity information could be used by governmental highway authorities to monitor changes in traffic patterns due to changes in roadway lane designations such as institution of high vehicle occupancy ("HVO") lanes.

BRIEF DESCRIPTION OF THE DRAWINGS

Preferred embodiments of the invention will be described below with reference to the following figures:

FIG. 3 is a simplified block diagram of a second preferred automatic driving-activity data collection unit for use in of the invention which permits generating and storing vehicle-location data on board the vehicle and then from time to time transferring the vehicle location data to a data processing system at a central station by storing the data on a floppy disc and transporting the floppy disc to the data processing system at the central station.

DETAILED DESCRIPTION OF THE PREFERRED EMBODIMENTS

A preferred embodiment of the invention entails the selection of a consumer driving-activity panel using standard statistical market research methods. The panel is selected based on a sampling universe of all households in a geographical region of interest having an automobile or other motor vehicle in which there is at least one licensed driver who has use of the vehicle. A preferred process for selecting a consumer driving-activity panel of consumer drivers includes: (1) statistically characterizing the sampling universe of households with motor vehicles and licensed drivers with respect to vehicle classifications and driver demographics; (2) obtaining a list of potential panelists for a consumer driving-activity panel who are drivers belonging to households in the sampling universe; (3) obtaining demographic data for selected ones of the list of potential panelists for the consumer panel as well as vehicle-classification data for motor vehicles driven by potential panelists selected, and (4) contacting and recruiting into the consumer driving-activity panel a group of consumer drivers from among the potential panelists for the panel for whom demographic and vehicle-classification data was obtained to form a consumer panel in which demographic and vehicle-classification characteristics of the sampling universe are represented to a statistically significant degree.

Demographic data should be obtained from each household of a panelist of the driving-activity panel. The demographic data preferably includes: name and age of the principle driver of the subject motor vehicle; the names and ages of all other drivers of the subject vehicle; the names and ages of other, non-driver members of the household, the sex of all named persons, the education level and employment status of all named persons, as well as household address, phone number and household income level. Vehicle-classification data concerning the subject vehicle, including vehicle make and model, year of manufacture, year of purchase or lease, color, and mileage, is also preferably collected. The demographic and vehicle-classification data may be collected from a knowledgeable member of the household by personal interview, telephone interview, written questionnaire, or a computer-screen form. The demographic and vehicle-classification data thus collected may be encoded for storage in a data processing system at a central station. Each named person in a panel household and each subject vehicle may be given an identification number to preserve anonymity.

Figure 1:
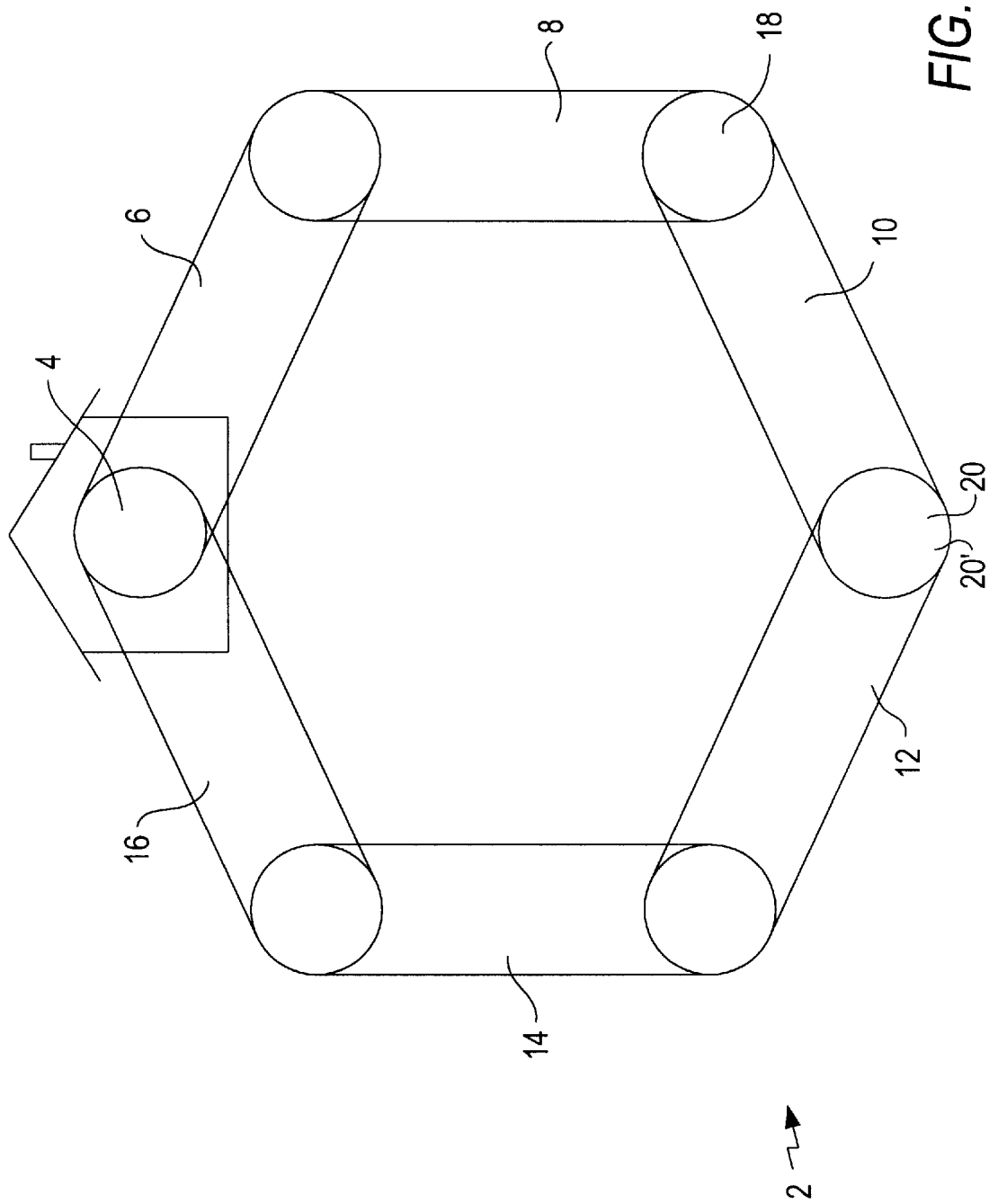
FIG. 1 is a schematic diagram representing the relationship between a round trip and trip segments making up the round trip.

For each trip segment which the subject vehicle makes, additional data can be collected. As shown schematically in FIG. 1, for purposes of data analysis, travel by a subject vehicle may be regarded as a series of round trips 2 from a home base 4 back to the home base 4. In general, each round trip 2 is made up of one or more trip segments 6, 8, 10, 12, 14, 16. Each trip segment represents travel from a starting point location 18 at which the vehicle is in a parked, power-off condition to a destination location 20 at which the vehicle is again placed in a parked, power-off condition. The destination location 20 of one trip segment 10 serves as the starting point location 20' of the next succeeding trip segment 12.

Figure 2:
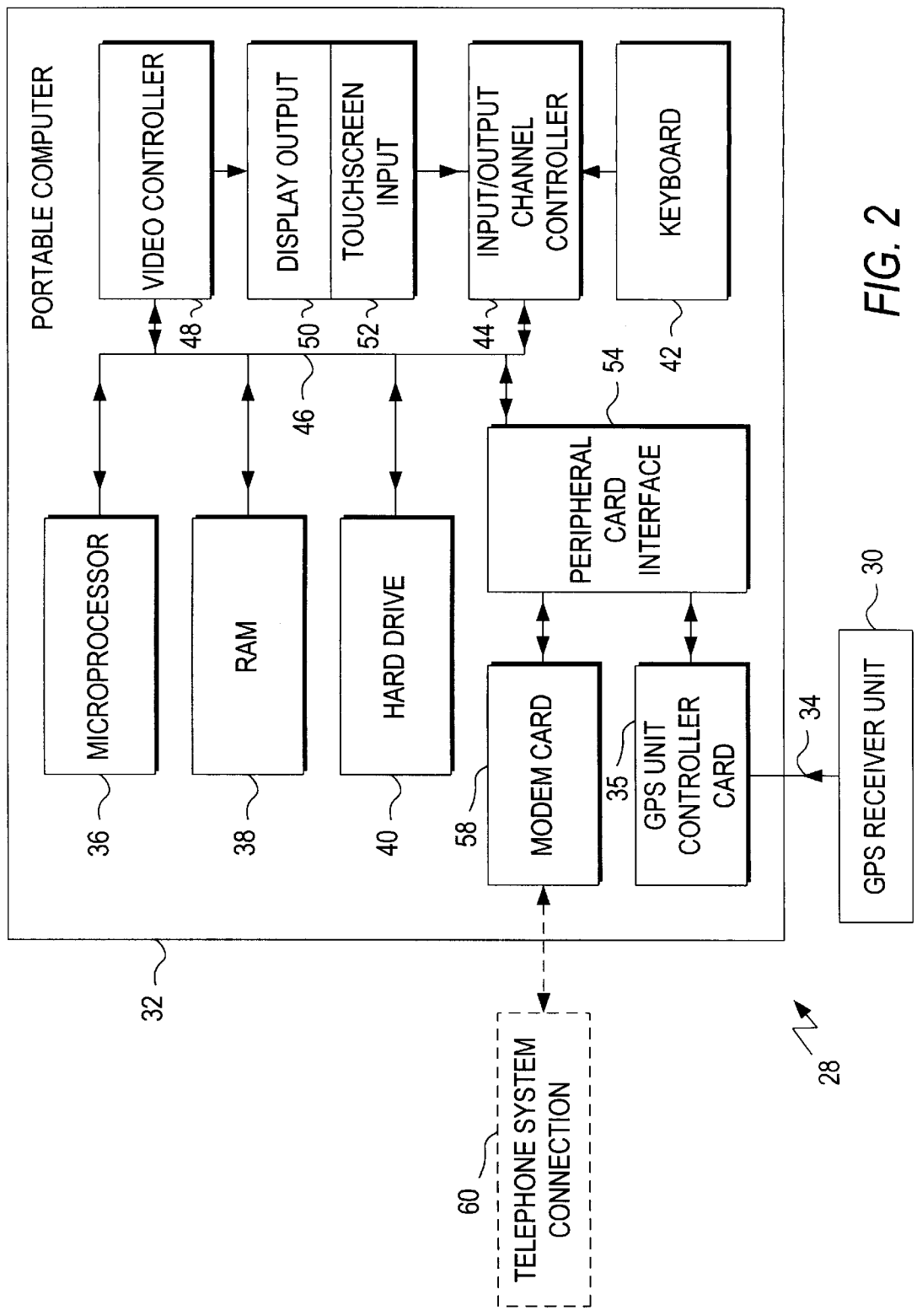
FIG. 2 is a simplified block diagram of a first preferred automatic driving-activity data collection unit for use in the invention which permits generating and storing vehicle-location data in the vehicle and then from time to time transferring the vehicle-location data via a modem and a wireline or wireless telephone-system connection to a data processing system at a central station.

Turning now to FIG. 2, an automatic driving-activity data collection unit 28 is adapted to be carried on board an automobile or other subject motor-vehicle (not shown). The data collection unit 28 includes a GPS receiver unit 30 connected to a portable computer 32 by means of a receiver connector cable 34 and a GPS unit controller card 35. The GPS receiver unit 30 is mounted in a subject vehicle at a position which provides a line-of-sight radiation-propagation view of the sky essentially unobstructed by metallic or other radiation shielding materials to permit reception of GPS satellite signals. The GPS receiver unit 30 may, for example, be mounted on a dashboard of the vehicle (not shown), on a rear deck of the vehicle beneath a rear window of the vehicle, in a trunk of the vehicle below the rear deck, provided the rear deck is made of cardboard or other substantially radiation-transparent material, or below the trunk lid, provided the trunk lid is made of a plastic composite or other substantially radiation-transparent material.

The portable computer 32 of the data collection until 28 of FIG. 2 includes a microprocessor 36, random-access read/write memory ("RAM") 38, and a hard drive 40 for mass storage. The portable computer 32 includes a keyboard 42 connected to an input/output channel controller 44. The microprocessor 36, RAM 38, hard drive 40 and input/output channel controller 44 are interconnected over a system bus 46. Also connected to the system bus 46 is a video controller 48, which is also connected to and drives a display screen output 50. Associated with the display screen output 50 is a touchscreen input 52, which is connected to the input/output channel controller 44. The touchscreen input 52 is adapted to generate signals in response to the touching of the display screen of the display screen output by a user which encode the position on the display screen which was touched. The portable computer 32 can therefore be programmed to display a prompt message on the display screen output along with a menu of possible replies to the prompt message. A user can choose an appropriate reply by touching the position on the display screen at which the desired reply appears, and the touchscreen input will generate signals which will permit the selected reply to be identified in the computer. For purposes of driving safety, the display screen may be blanked when the data-collection unit 28 detects that the vehicle is in motion. Also connected to the system bus 46 is a peripheral card interface 54. Peripheral device cards may be plugged into the peripheral card interface 54 through slots in a housing (not shown) of the portable computer 32. The GPS unit controller card 35 is plugged into the peripheral card interface 54 of the portable computer 32. A modem card 58 is also plugged into the peripheral card interface 54 of the portable computer 32. The modem card 58 may be connected to a wireline or wireless telephone system connection 60 for transferring data to a data processing system at a central station or for receiving data from the data processing system at the central station—for changing prompt messages from time to time during a longitudinal consumer driving-activity survey, for example.

In operation, the GPS receiver unit 30 receives location definition signals from GPS satellites and, in conjunction with the GPS unit controller card 35, converts the signals into digital location geodetic coordinate data, which defines in terms of latitude and longitude the location of the receiver unit 30 and hence the subject motor vehicle at the time the location definition signals were received. The microprocessor 36 runs a location-data-collection program which causes the microprocessor to transfer location coordinate data at intervals from the GPS unit controller card to the hard drive 40 by way of the peripheral card interface 54 and system bus 46. The location coordinate data are stored as a data sequence encoding successive location coordinates of the subject vehicle in association with data encoding times at which the vehicle was located at the locations specified by the coordinates. To conserve data storage in view of the typically widely varying speeds of a subject motor vehicle, successive location coordinates could differ by an approximately fixed interval of distance; say, 250 meters.

Turning next to FIG. 3, an automatic driving-activity data collection unit 68 is adapted to be carried on board a subject motor vehicle (not shown). Elements essentially common to the automatic driving-activity data collection unit 68 of FIG. 3 and the automatic driving-activity data collection unit 28 of FIG. 2 have identical reference numerals in the Figures. The data collection until 68 includes a GPS receiver unit 30 connected to a portable computer 70 by means of a receiver connector cable 34 and a GPS unit controller card 35. The GPS receiver unit 30 is mounted in the subject motor vehicle at a position which provides a line-of-sight radiation propagation view of the sky to permit reception of GPS satellite signals as described above in connection with the automatic driving-activity data collection unit 28 of FIG. 2.

The portable computer 70 of the automatic driving-activity data-collection unit 68 of FIG. 3 includes a microprocessor 72, random access read/write memory 38, a hard drive 40, an input/output channel controller 44, a video controller 48, and a peripheral card interface unit 54 interconnected by a system bus 46. The microprocessor 72 is also connected to cache memory 74 via a dedicated cache memory bus 76. A keyboard 42 is connected to the input/output channel controller 44.

Also connected to the input/output channel controller 44 is a vehicle power system sensor 78 which in turn is connected to the electric power system 80 of the vehicle by plugging into a cigarette lighter of the vehicle. The vehicle power system sensor 78 is a digital voltage sensor which generates a digital vehicle-electrical-power-on/off signal responsive to whether the vehicle electrical power is on or off. By monitoring the digital vehicle electrical power on/off signal applied by the vehicle power system sensor 78 applied to the input/output channel controller 44, the portable computer 70 can detect transitions from a vehicle-electrical-power-off condition to a vehicle-electrical-power-on condition, which ordinarily marks the start of a trip segment, and transitions from a vehicle-electrical-power-on condition to a vehicle-electrical-power-on condition, which ordinarily marks the arrival of the subject vehicle at a destination location.

A sound card 82 is connected to the peripheral card interface 54 of the portable computer 70. The sound card 82 in turn is connected to a speaker 84 and a microphone 86 mounted in a housing (not shown) of the portable computer. Although for clarity in FIG. 3 the sound card 82 is shown directly connected to the speaker 84 and the microphone 86, such connections would generally be made through the peripheral card interface 54. The sound card 82 supports speech synthesis software and voice-recognition software running on the portable computer 70. Processing speed enhancements of the microprocessor 72 afforded by the cache memory 74 further support the running of the voice synthesis software and the voice recognition software. The speech recognition and voice synthesis capabilities of the portable computer 70 provide speech input and voice output facilities for voice prompt messages and spoken replies in connection with collecting trip segment information such as the identification of the driver, identification of passengers, purpose of the trip segment, and destination activities.

A floppy disc drive 88 is connected to the system bus 46. Time annotated vehicle-location data can be written to a floppy disc in the floppy disc drive 88 and the floppy disc removed for forwarding to a data processing system at a central station for processing. In addition, prompt messages output to the driver by the portable computer 70 may be reprogrammed form time to time during the course of a longitudinal consumer driving activity survey by loading prompt-message data into the computer 70 from a floppy disc using the floppy disc drive 88.

An automatic driving-activity data collection unit 28, 68 may be installed in a subject vehicle and be used for the recording of trip-specific data including driver identification, vehicle occupant identification, date, time, starting mileage, and destination data. The components of such data collection unit include a digital data storage system and input/output facilities whereby the driver can input data into the data storage system. The input/output facilities comprise a display screen and keypad or keyboard so that the driver may respond to prompt messages displayed on the display. Prompt messages in the form of questions can be displayed on the display screen of the unit along with a list of responses for the driver to scroll through and select. Alternatively, the display screen of the data collection unit can have touch capability, so that the driver can indicate a response to a displayed question by touching the display screen directly. As noted above, the automatic driving-activity data collection unit can be equipped with voice recognition, recording and synthesis systems such that the input/output facilities of the unit can be voice activated and the driver can be questioned and respond vocally. The automatic data collection unit can be equipped with any combination of types of input/output facilities such that the unit may prompt the driver on a display screen or vocally and receive responses from the driver manually by keyboard, manually by touchscreen, vocally or by a combination of these methods. The input/output facilities of the data collection unit may is also be used to initialize the system by recording the information such as: vehicle make and model, vehicle year, vehicle identification number, and household identification number. Such information can be transmitted with each normal data upload to the data processing system at the central station. A voice recognition session can be carried out during the initialization of those data collection units equipped with voice recognition systems to enable the units to recognize the voice of the driver. For safety purposes, the user interface may be disabled when the motor of the vehicle is in motion.

As noted above, for each trip segment driven by a subject trackable motor vehicle, trip-segment polling prompt messages prompting for identification of the driver, any passengers and the purpose of the trip segment are preferably communicated to the driver of the vehicle by input/output facilities of a portable computer on board the vehicle. If desired, polling prompt messages could additionally prompt for information from the driver concerning seatbelt use of by the driver and any passengers, use of any child restraint devices, the location of passengers in the vehicle—e.g. front or rear seat—and the setting of any airbag on/off switch. Destination activity prompt messages could, if desired, prompt for information concerning purchases made and prices paid at retail establishments at the destination, credit card use, quality of service received, cleanliness of establishments visited, and whether or not a particular advertising campaign had been experienced previously. Preferably automatic driving activity data collection units for use in the invention include portable computers which can be reprogrammed in the field during the course of a longitudinal driving-activity survey to change prompt messages, for example. Prompt messages can therefore be changed from time to time, for example, to take account of the introduction and withdrawal of advertising campaigns which potentially could influence driving activity.

Appendix A is a listing of the various data elements which could be captured by a preferred system of the invention. The data elements are organized into sections to reflect the entry of information which might be obtained over the course of a single trip segment. Data which is automatically generated by the driving-activity data collection unit is identified by an "x" in Appendix A. Data which is entered by a driver is identified in Appendix A by an "M." In some instances, data can be obtained either by entering by the driver into the data-collection unit or automatically generated by the data collection unit which is identified by an "M/x" in Appendix A.

The time annotated vehicle-location data collected at the data processing system at the central station from the various automated driving-activity data collection units can be processed and statistically analyzed using methods known to those skilled in the art to obtain commercially useful information about each trip segment taken by each subject vehicle. The vehicle-location data and panelist attribute data from survey groups of panelists can be analyzed statistically to produce a set of consumer driving-activity market research information of interest to a variety of consumer produce and marketing companies and governmental agencies. Tables IV through VI below provide hypothetical examples of the types of consumer driving-activity market research information which may be obtained with preferred embodiments of the invention.

Table IV presents hypothetical consumer driving-activity market research information concerning miles travelled, hours travelled, average speed and idle time by route taken. Such market research information could be useful to governmental agencies in that it would provide information concerning relative usage of different road types determined from route-designation data. As shown in Table IV, the invention would enable average speed and idle time on each route type to be measured.

Table V presents hypothetical market research information concerning speeding drivers by number of miles driven annually by vehicle insurance carrier which could be obtained with a preferred method of the invention. A speeding driver might be defined as a driver who averages 5 mph or more higher than the speed limit on primary roads. Information of the type presented in Table V would be useful to an insurance carrier in assessing its risk level relative to its competitors.

Table VI presents hypothetical market research information which could be obtained with a preferred embodiment of the invention concerning total gasoline purchasers, gallons of gasoline purchased, and gallons per buyer by oil company. To obtain such information, the automatic driving-activity data collection units could be programmed to prompt for information concerning gas purchasing when a stop of less than fifteen minutes was made at a filling station location or if no gasoline purchases had been reported for the subject vehicle over the previous 300 miles of travel by the vehicle. Drivers would be prompted for information concerning whether gasoline was purchased, how many gallons, what brand, and at what price. Market research information of the type presented in Table VI would be of use to oil companies in providing measures of brand loyalty vis-a-vis competitors and for monitoring the impact of advertising campaigns longitudinally over time.

TABLE IV (hypothetical data)
MILES TRAVELED, HOURS TRAVELED, AVERAGE SPEED, AND IDLE TIME
BY TYPE OF ROUTE TAKEN

|  | Miles Traveled | | Hours Traveled | | Average | Idle Time (min) per |
| --- | --- | --- | --- | --- | --- | --- |
|  | per Household | per Vehicle | per Household | per Vehicle | Speed on Route (mph) | Hour on Route |
| Total | 17810 | 13000 | 408 | 295 | 44 | 2.6 |
| Primary Route | 10960 | 8000 | 201 | 145 | 55 | 1 |
| 3- or 4-lane expressway | 6850 | 5000 | 125 | 91 | 55 | 1 |
| 2-lane expressway | 4110 | 3000 | 75 | 55 | 55 | 1 |
| Secondary Route | 4110 | 3000 | 99 | 71 | 42 | 7 |
| Rural Route or Side Street | 2055 | 1500 | 74 | 54 | 28 | 5 |
| Other | 685 | 500 | 35 | 25 | 20 | 2 |

TABLE V (hypothetical data)
SPEEDING DRIVERS BY NUMBER OF MILES DRIVEN ANNUALLY ("MDA")
BY VEHICLE INSURANCE CARRIER

|  |  | Non-Speeders | | | Speeders | | |
| --- | --- | --- | --- | --- | --- | --- | --- |
| Miles Driven Annually by Carrier | Total | Low <9,000 | Medium 9,000– 12,000 | High >12,000 | Low <9,000 | Medium 9,000– 12,000 | High >12,000 |
| Total | 18307 | 1831 | 3021 | 544 | 1450 | 7250 | 4212 |
|  |  | 10.0% | 17.0% | 3.0% | 8.0% | 40.0% | 23.0% |
| ABC | 5492 | 545 | 1113 | 120 | 400 | 1800 | 1514 |
|  | 30.0% | 10.0% | 20.0% | 2.0% | 7.0% | 33.0% | 28.0% |
| EFG | 5126 | 1238 | 1345 | 165 | 322 | 1256 | 800 |
|  | 28.0% | 24.0% | 26.0% | 3.0% | 6.0% | 25.0% | 16.0% |

TABLE V-continued (hypothetical data)
SPEEDING DRIVERS BY NUMBER OF MILES DRIVEN ANNUALLY ("MDA")
BY VEHICLE INSURANCE CARRIER

| | | Non-Speeders | | | Speeders | | |
| --- | --- | --- | --- | --- | --- | --- | --- |
| Miles Driven Annually by Carrier | Total | Low <9,000 | Medium 9,000– 12,000 | High >12,000 | Low <9,000 | Medium 9,000– 12,000 | High >12,000 |
| IJK | 3661 | 1370 | 1414 | 213 | 126 | 432 | 106 |
| | 20.0% | 37.0% | 39.0% | 6.0% | 3.0% | 12.0% | 3.0% |
| MNO | 2197 | 161 | 401 | 150 | 228 | 745 | 512 |
| | 12.0% | 7.0% | 18.0% | 7.0% | 10.0% | 34.0% | 23.0% |
| Other | 1831 | 357 | 489 | 512 | 103 | 108 | 262 |
| | 10.0% | 10.0% | 27.0% | 28.0% | 6.0% | 6.0% | 14.0% |

TABLE VI (hypothetical data)
TOTAL GAS PURCHASERS, GALLONS PURCHASED,
AND GALLONS PER PURCHASER BY MILES
DRIVEN ANNUALLY BY OIL COMPANY

| | | | Gallons per Purchaser | | | |
| --- | --- | --- | --- | --- | --- | --- |
| Oil Company | Number of Purchasers | Gallons Purchased | Total | Low <9,000 | Medium 9,000– 12,000 | High >12,000 |
| BCD | 5500 | 50000000 | 909 | 214 | 294 | 401 |
| FGH | | 4100000 | 1171 | 276 | 379 | 517 |
| JKL | 2700 | 2000000 | 741 | 174 | 240 | 327 |
| NOP | 2150 | 4000000 | 1860 | 438 | 602 | 821 |
| RST | 917 | 1000000 | 1091 | 257 | 353 | 481 |
| VWX | 901 | 1750000 | 1942 | 457 | 628 | 857 |
| Other | 3200 | 4200000 | 1313 | 309 | 425 | 579 |
| TOTAL | 18868 | 22050000 | 1169 | 800 | 1100 | 1500 |

It is not intended to limit the present invention to the specific embodiments described above. It is recognized that changes may be made in the invention specifically described herein without departing from the scope and teachings of the instant invention, and it is intended to encompass all other embodiments, alternatives and modifcations consistent with the invention.

APPENDIX A

TRIP SEGMENT
DATA ELEMENT SOURCES
X = Automated    M = manually entered

| | From In-Vehicle Unit | | | | Central | |
| --- | --- | --- | --- | --- | --- | --- |
| Data Element | Start Trip | Segment Start | Segment End | End Trip | Data Base ("DB") | Comments |
| Initial Set-Up Information: | | | | | | |
| Vehicle Description | | | | | M | Entered from participant input sheet |
| Vehicle Mileage | | | | | M | Entered from participant input sheet |
| Driver Information | | | | | M | Entered from participant input sheet |
| Passenger Information | | | | | M | Entered from participant input sheet |
| Tracking Device Ser. No. | | | | | M | Entered from participant input sheet |
| Vehicle ID No. for Tracking | | | | | M | Entered from participant input sheet |
| Home Lat./Long. | | | | | M | Entered from participant input sheet |
| Trip Start Information: | | | | | | |
| Driver ID No. | M | | | | X | Entered from vehicle & matched to DB |

APPENDIX A-continued

TRIP SEGMENT
DATA ELEMENT SOURCES
X = Automated    M = manually entered

| Data Element | From In-Vehicle Unit | | | | Central | Comments |
|---|---|---|---|---|---|---|
| | Start Trip | Segment Start | Segment End | End Trip | Data Base ("DB") | |
| Driver Name | | | | | X | Derived from driver ID & matched |
| Driver Sex | | | | | X | Derived from driver ID & matched |
| Driver Age | | | | | X | Derived from driver ID & matched |
| Driver Income | | | | | X | Derived from driver ID & matched |
| Driver Phone No. | | | | | X | Derived from driver ID & matched |
| Passenger(s) ID No(s). | M | | | | X | Entered from vehicle & matched to DB |
| Passenger Name | | | | | X | Derived from passenger ID & matched |
| Passenger Sex | | | | | X | Derived from passenger ID & matched |
| Passenger Age | | | | | X | Derived from passenger ID & matched |
| Tracking Device Ser. No. | X | | | | X | Match to Central DB |
| Vehicle ID No. for Tracking | X | | | | X | Match to Central DB |
| Home Lat./Long. | X | | | | X | Match to Central DB |
| Trip Start Lat./Long. | X | | | | | |
| Start Locat. Description | M/X | | | | X | Entered from vehicle or matched to DB |
| Trip Start-Date | X | | | | | |
| Trip Start-Time | X | | | | | |
| Trip Start Mileage | X | | | | | |
| Customer Questions and Responses | X | | | | | From in-vehicle data collection unit |
| Segment Start Information: | | | | | | |
| Segment Start Lat./Long. | | X | | | | |
| Segment Locat. Description | | M/X | | | X | Entered from vehicle or matched to DB |
| Segment Start-Date | | X | | | | |
| Segment Start-Time | | X | | | | |
| Segment Start Mileage | | X | | | | |
| Segment End Information: | | | X | | | |
| Segment End Lat./Long. | | | X | | | |
| End Locat. Description | | | M/X | | X | Entered from vehicle or matched to DB |
| Segment End-Date | | | X | | | |
| Segment End-Time | | | X | | | |
| Segment Total Time | | | X | | | |
| Segment Max. Speed | | | X | | | |
| Segment Avg. Speed | | | X | | | |
| Segment Total Mileage | | | X | | | |
| Destination-Prompts and Responses | | | X | | | From in-vehicle data collection unit |
| Trip End Information: | | | | | | |
| Trip End Lat./Long. | | | | X | | Match to Central DB-Home location |
| End Locat. Description | | | | M/X | X | Entered from vehicle or matched to DB |
| Trip End-Date | | | | X | | |
| Trip End-Time | | | | X | | |
| Trip Total Time | | | | X | X | Could be calculated either place |
| Trip Max. Speed | | | | X | X | Could be calculated either place |
| Trip Avg. Speed | | | | X | X | Could be calculated either place |
| Trip Total Mileage | | | | X | X | Could be calculated either place |
| Destination-Prompts and Responses | | | | X | | From in-vehicle data collection unit |

What is claimed is:

1. A method of obtaining consumer driving-activity market research information comprising the following steps:

(a) selecting a plurality of panelists to form a consumer driving-activity panel, at least one subject trackable motor vehicle and at least one subject consumer driver being in association with each panelist of the consumer driving-activity panel, the subject consumer driver in association with the panelist having use of the subject trackable motor vehicle in association with the panelist, the subject trackable motor vehicles in association with the panelists collectively forming the consumer driving-activity panel providing representatives from a varied plurality of vehicle-classification categories and the subject consumer drivers in association with such panelists providing representatives from a varied plurality of demographic categories;

(b) for each panelist in the consumer driving-activity panel, storing panelist attribute data corresponding to the panelist in a data processing system, the panelist attribute data including vehicle-classification data concerning each subject trackable motor vehicle in association with the panelist and demographic data concerning each subject consumer driver in association with the panelist;

(c) for each subject trackable motor vehicle and each trip portion of a sample group of trip portions driven by the subject trackable motor vehicle, automatically generating time-annotated vehicle-location data approximately tracking the movement of the subject trackable motor vehicle during the trip portion by means of automatic vehicle-location tracking gear on the subject vehicle and storing the time-annotated vehicle-location data in digital data storage, the time-annotated vehicle-location data for the trip portion comprising a data sequence encoding successive location coordinates and associated times approximately tracking the movement of the subject vehicle during the trip portion;

(d) for each subject trackable motor vehicle and each trip portion of the sample group of trip portions driven by the subject vehicle, analyzing time-annotated vehicle-location data associated with the trip portion to generate a set of trip-portion vehicle-use data including data encoding the date, the approximate time of day, and the approximate duration of the trip portion; the approximate starting point coordinates and the approximate destination coordinates of the trip portion; the approximate distance driven by the subject vehicle in the trip portion; and a representative approximate speed driven by the subject vehicle during the trip portion;

(e) for each subject trackable motor vehicle, associating trip-portion vehicle-use data for the sample group of trip portions driven by the subject vehicle in the data processing system with elements of panelist attribute data corresponding to the panelist of the consumer driving-activity panel with which the subject trackable motor vehicle is in association; and (f) with the data processing system, analyzing statistically, over a survey group of panelists of the consumer driving-activity panel, trip-portion vehicle-use data and associated panelist attribute data to obtain consumer driving-activity market research information.

2. The method of obtaining consumer driving-activity market research information according to claim 1 in which each panelist of the consumer driving-activity panel is a household, the at least one subject trackable motor vehicle in association with the panelist is a motor vehicle of which driver members of the household have use, and the at least one subject consumer driver in association with the panelist is a member of the household.

3. The method of obtaining consumer driving-activity market research information according to claim 1 in which each panelist is a trackable motor vehicle, the at least one subject trackable motor vehicle in association with the panelist is the trackable-motor-vehicle panelist itself, and the at least one subject consumer driver in association with the panelist is a consumer driver having use of the trackable-motor-vehicle panelist.

4. The method of obtaining consumer driving-activity market-research information according to claim 1 in which each panelist is a consumer driver, the at least one subject trackable motor vehicle in association with the panelist is a trackable motor vehicle of which the consumer-driver panelist has use, and the at least one subject consumer driver in association with the panelist is the consumer-driver panelist himself or herself.

5. The method of obtaining consumer driving-activity market research information according to claim 1 in which the number of panelists in the consumer driving-activity panel exceeds 10,000.

6. The method of obtaining consumer driving-activity market research information according to claim 1 in which the vehicle-classification categories for which representatives are provided as subject trackable motor vehicles in association with panelists collectively forming the consumer driving-activity panel include automobiles, vans, and sport-utility vehicles.

7. The method of obtaining consumer driving-activity market research information according to claim 6 in which the demographic data concerning each subject consumer driver in association with a panelist of the consumer driving-activity panel includes data encoding the age and the sex of the subject consumer driver.

8. The method of obtaining consumer driving-activity market research information according to claim 6 in which the demographic data concerning each subject consumer driver in association with a panelist of the consumer driving-activity panel includes data encoding a personal income level of the subject consumer driver or a household income level of a household of which the subject consumer driver is a member.

9. The method of obtaining consumer driving-activity market research information according to claim 8 in which the demographic data concerning each subject consumer driver in association with a panelist of the consumer driving-activity panel further includes data encoding an education level and an employment status of the subject consumer driver.

10. The method of obtaining consumer driving-activity market research information according to claim 6 in which the vehicle classification data concerning each subject trackable motor vehicle in association with a panelist of the consumer driving-activity panel includes data encoding a manufacturer and a type of the vehicle.

11. The method of obtaining consumer driving-activity market research information according to claim 6 in which the automatic vehicle-location tracking gear on each subject trackable motor vehicle includes a global positioning system ("GPS") satellite receiver for receiving GPS satellite signals for determining location geodetic coordinate data specifying the approximate location of the subject vehicle at the time the satellite signals were received.

12. The method of obtaining consumer driving-activity market research information according to claim 11 in which the data processing system is located in a central station and is in communication with wireless receiver gear, in which each subject trackable motor vehicle is equipped with wireless transmitter gear connected to the automatic vehicle-location tracking gear, and in which the step (c) of automatically generating and storing time-annotated vehicle-location data for each subject trackable motor vehicle and each trip portion of the sample group of trip portions includes continually transmitting signals encoding vehicle-location data generated by means of the automatic vehicle-location tracking gear from the wireless transmitter gear on the subject vehicle to the wireless receiver gear and storing time-annotated vehicle-location data for the trip portion in digital data storage of the data processing system.

13. The method of obtaining consumer driving-activity market research information according to claim 12 in which the wireless transmitter gear and the wireless receiver gear constitute elements of a cellular telephone system.

14. The method of obtaining consumer driving-activity market research information according to claim 11 in which each subject trackable motor vehicle includes read/write digital data storage connected to the automatic vehicle-location tracking gear; and in which the step (c) of automatically generating and storing time-annotated vehicle-location data for each subject trackable motor vehicle and each trip portion of the sample group of trip portions includes storing the time-annotated vehicle-location data in the digital data storage of the subject vehicle.

15. The method of obtaining consumer driving-activity market research information according to claim 14 in which the data processing system is located in a central station, and in which the method further comprises a step of, for each subject trackable motor vehicle and each trip portion of a data-report group of trip portions driven by the subject vehicle, transferring time-annotated vehicle-location data corresponding to the data-report group of trip portions from the read/write digital data storage on the subject vehicle to the data processing system in the central station.

16. The method of obtaining consumer driving-activity market research information according to claim 15 in which the read/write digital data storage of each subject trackable motor vehicle is adapted to store time-annotated vehicle-location data in removable mass-storage media, in which the data processing system in the central station includes a removable-media reader for reading the removable mass-storage media, and in which the step of transferring the time-annotated vehicle-location data corresponding to the data-report group of trip portions from the digital data storage on the subject vehicle to the data processing system in the central station comprises the steps of storing such vehicle-location data on removable mass-storage media in the read/write digital data storage, removing the removable mass-storage media on which the time-annotated vehicle-location data was recorded from the storage on the subject vehicle, transporting the removable mass-storage media to the data processing system at the central station, and reading the removable mass-storage media at the central station with the removable-media reader of the data processing system.

17. The method of obtaining consumer driving-activity market research information according to claim 16 in which the removable mass-storage media is a digital magnetic tape, a floppy magnetic disc, or a removable hard magnetic disc.

18. The method of obtaining consumer driving-activity market research information according to claim 15 in which the time-annotated vehicle-location data is transferred from the read/write digital data storage on the subject vehicle to the data processing system in the central station by way of a modem and telephone line connection.

19. The method of obtaining consumer driving-activity market research information according to claim 6 in which the representative approximate speed of step (d) is an approximate average speed.

20. The method of obtaining consumer driving-activity market research information according to claim 6 in which the representative approximate speed of step (d) is an approximate maximum speed.

21. The method of obtaining consumer driving-activity market research information according to claim 6 in which step (d) of analyzing time-annotated vehicle-location data associated with each trip portion of the sample group of trip portions further comprises using location coordinates encoded in the data sequence of the time-annotated vehicle-location data for the trip portion to access route-designator data in a location-coordinate-indexed route-designator table, the route-designator data so accessed encoding a designation of a route taken by the subject vehicle in the trip portion.

22. The method of obtaining consumer driving-activity market research information according to claim 21 in which route-designator data in the location-coordinate-indexed route-designator table includes data encoding a speed limit associated with a route designated by the route-designator data; in which the representative approximate speed of step (d) is an approximate maximum speed driven by the subject trackable motor vehicle on the route designated by the route-designator data; and in which step (d) of analyzing time-annotated vehicle-location data associated with each trip portion of the sample group of trip portions comprises comparing the approximate maximum speed driven by the subject vehicle on the route designated by the route-designator data with the speed limit associated with the route.

23. The method of obtaining consumer driving-activity market research information according to claim 6 in which step (d) of analyzing time-annotated vehicle-location data associated with each trip portion of the sample group of trip portions further comprises using destination coordinates of the trip-portion vehicle-use data for the trip portion to access location-designator data in a location-coordinate-indexed location-designator table, the location-designator data so accessed encoding a designation of a destination of the trip portion.

24. The method of obtaining consumer driving-activity market research information according to claim 6 in which each subject trackable motor vehicle is equipped with a portable digital computer having a microprocessor, read/write data storage, and input/output facilities, the portable computer being data-transfer connected to the automatic vehicle-location tracking gear; in which each trip portion of the sample group of trip portions essentially constitutes a trip segment extending from a first vehicle-stationary condition at a trip-segment starting-point location to a second vehicle-stationary condition at a trip-segment destination location; and in which the method further comprises the steps of, for each subject trackable motor vehicle and each trip segment of the sample group of trip segments, outputting a trip-segment polling prompt message when the vehicle is located at the trip-segment starting-point location using the input/output facilities of the portable computer and storing in the portable computer a reply to the polling prompt message entered into the computer using the input/output facilities of the computer.

25. The method of obtaining consumer driving-activity market research information according to claim 24 in which the trip-segment polling prompt message for each trip segment of the sample group of trip segments includes prompts for identification of the driver of the subject vehicle, any passengers in the subject vehicle, and the purpose of the trip segment.

26. The method of obtaining consumer driving-activity market research information according to claim 25 in which the prompt for identification of the driver of the subject vehicle includes a driver-choice menu output using the input/output facilities of the computer listing each driver who is a member of a household with which the subject vehicle is in association, the prompt for identification of any passengers in the subject vehicle includes a passenger-choice menu output using the input/output facilities of the computer listing each member of the household, and the prompt for identification of the purpose of the trip segment includes a purpose-choice menu output using the input/output facilities of the computer listing choices for trip-segment purposes, and in which the step of storing a reply to the polling prompt message includes storing a choice of driver selected from the driver-choice menu, any choices of passenger selected from the passenger-choice menu, and a choice of trip-segment purpose selected from the purpose-choice menu entered using the input/output facilities of the computer.

27. The method of obtaining consumer driving-activity market research information according to claim 24 in which each subject trackable motor vehicle has a vehicle electric power system, the vehicle electric power system being in a vehicle-electrical-power-on condition when the subject vehicle is being driven and the subject vehicle generally being stationary when the vehicle electric power system is in a vehicle-electrical-power-off condition, the portable computer on the subject vehicle being in vehicle-electrical-power-on/off-monitoring communication with the vehicle electric power system of the vehicle, and in which the method further comprises the steps of monitoring the electric power system of each subject trackable motor vehicle with the portable computer on the subject vehicle to detect a transition from a vehicle-electrical-power-off condition to a vehicle-electrical-power-on condition and, responsive to detecting such power-off-to-power-on transition, outputting the trip-segment polling prompt message when the subject vehicle is at a trip-segment starting-point location.

28. The method of obtaining consumer driving-activity market research information according to claim 24 in which the input/output facilities of the portable computer on each subject trackable motor vehicle include a visual display output and a manual keyboard input or a touchscreen input.

29. The method of obtaining consumer driving-activity market research information according to claim 24 in which the input/output facilities of the portable computer on each subject trackable motor vehicle include an audio speaker output drivable by voice synthesis software running on the computer and a microphone digitizer input adapted to provide digitized speech data to speech recognition software running on the computer.

30. The method of obtaining consumer driving-activity market research information according to claim 6 in which each subject trackable motor vehicle is equipped with a portable digital computer having a microprocessor, read/write data storage, and input/output facilities, the portable computer being data-transfer connected to the automatic vehicle-location tracking gear; in which the subject trackable motor vehicle has a vehicle electric power system, the vehicle electric power system being in a vehicle-electrical-power-on condition when the subject vehicle is being driven and the subject vehicle generally being stationary when the vehicle electric power system is in a vehicle-electrical-power-off condition, the portable computer on the subject vehicle being in vehicle-electrical-power-on/off-monitoring communication with the vehicle electric power system of the vehicle; in which each trip portion of the sample group of trip portions essentially constitutes a trip segment extending from a first vehicle-stationary condition at a trip-segment starting-point location to a second vehicle-stationary condition at a trip-segment destination location; and in which the method further comprises the steps of, for each subject trackable motor vehicle and each trip segment of the sample group for trip segments, monitoring the vehicle electric power system of each subject trackable motor vehicle to detect a transition from a vehicle-electrical-power-on condition to a vehicle-electrical-power-off condition and, responsive to detecting such power-on-to-power-off transition, storing trip-segment destination location data encoding location coordinates of the subject vehicle to define destination coordinates for the trip segment.

31. The method of obtaining consumer driving-activity market research information according to claim 30 in which step (d) of analyzing time-annotated vehicle-location data associated with each trip segment of the sample group of trip segments further comprises using destination coordinates of the trip-segment vehicle-use data for the trip segment to seek location-designator data in a location-coordinate-indexed location-designator table in the portable computer, the location-designator data if found encoding a designation of a location for the destination of the trip segment, and, in the event no location-designator data corresponding to the destination coordinates is found in the location-designator table, outputting a destination-designation prompt message using the input/output facilities of the portable computer prompting for identification of a designation of the destination and storing in the location-coordinate-indexed location-designator table as location-designator data indexed with the destination coordinates a reply to the destination-designation prompt message entered into the portable computer using the input/output facilities of the computer.

32. The method of obtaining consumer driving-activity market research information according to claim 30 in which the input/output facilities of the portable computer of each subject vehicle include a visual display output and a manual keyboard input or a touchscreen input.

33. The method of obtaining consumer driving-activity market research information according to claim 30 in which the input/output facilities of the portable computer of each subject vehicle include an audio speaker output drivable by voice synthesis software running on the computer and a microphone digitizer input adapted to provide digitized speech data to speech recognition software running on the computer.

34. The method of obtaining consumer driving-activity market research information according to claim 6 in which each subject trackable motor vehicle is equipped with a portable digital computer having a microprocessor, read/write data storage, and input/output facilities, the portable computer being data-transfer connected to the automatic vehicle-location tracking gear; in which each trip portion of the sample group of trip portions essentially constitutes a trip segment extending from a first vehicle-stationary condition at a trip-segment starting-point location to a second vehicle-stationary condition at a trip-segment destination location; and in which the method further comprises the step of, for each subject trackable motor vehicle and each trip segment of the sample group of trip segments at the trip-segment destination location, using destination coordinates of the trip-segment vehicle-use data for the trip segment to access location-designator data in a location-coordinate-indexed location-designator table in the portable computer, the location-designator data so accessed encoding a designation for the destination of the trip segment, and using the input/output facilities of the portable computer to output a destination-activity prompt message corresponding to the destination designated by the location-designator data prompting for information concerning activities carried out at the destination designated and storing any reply to the destination-activity prompt message entered into the portable computer using the input/output facilities of the computer.

35. The method of obtaining consumer driving-activity market research information according to claim 34 in which the destination designated is a retail store and the destination-activity prompt message corresponding to the destination designated comprises a prompt for any amount of money spent at the store.

36. The method of obtaining consumer driving-activity market research information according to claim 34 in which the destination designated is a shopping center and the destination-activity prompt message corresponding to the destination designated comprises prompts for identification of any businesses visited at the shopping center and identification of businesses at the shopping center at which purchases were made.

37. The method of obtaining consumer driving-activity market research information according to claim 34 in which the destination designated is a service station and the destination-activity prompt message corresponding to the destination designated comprises prompts for identification of the quantity of any gasoline purchased at the service station and identification of the price paid for the gasoline.

38. The method of obtaining consumer driving-activity market research information according to claim 34 further comprising the step of, for each subject trackable motor vehicle, reprogramming the portable digital computer on the subject vehicle to change destination-activity prompt messages output using the input/output facilities of the computer.

39. The method of obtaining consumer driving-activity market research information according to claim 38 in which a destination-activity prompt message is changed by reprogramming the portable computer of each subject vehicle to prompt for identification of whether the subject consumer driver encountered a particular advertising campaign pertaining to the destination designated corresponding to the prompt message.

* * * * *